(12) United States Patent
Nagaoka et al.

(10) Patent No.: US 6,531,959 B1
(45) Date of Patent: Mar. 11, 2003

(54) POSITION DETECTING DEVICE

(75) Inventors: Nobuharu Nagaoka, Wako (JP); Takayuki Tsuji, Wako (JP); Masahito Watanabe, Wako (JP); Hiroshi Hattori, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 214 days.

(21) Appl. No.: 09/612,799

(22) Filed: Jul. 10, 2000

(30) Foreign Application Priority Data

Jul. 13, 1999 (JP) .............................. 11-199589

(51) Int. Cl.$^7$ ................................. B60Q 1/00
(52) U.S. Cl. ...................... 340/435; 340/436; 340/903; 340/905; 340/937; 340/995; 382/104; 382/103; 382/289; 382/293
(58) Field of Search ................ 340/903, 937, 340/435, 436, 905, 995; 382/104, 289, 293; 348/148, 208, 169, 142

(56) References Cited

U.S. PATENT DOCUMENTS 5,850,254 A * 12/1998 Takano et al. ............... 340/903
5,959,724 A * 9/1999 Izumi et al. ................ 356/3.14
5,963,148 A * 10/1999 Sekine et al. ................ 340/905
6,037,975 A * 3/2000 Aoyama ..................... 348/113
6,067,110 A * 5/2000 Nonaka et al. ............. 340/903
6,067,147 A * 5/2000 Hirabayashi et al. ...... 356/3.14
6,172,601 B1 * 1/2001 Wada et al. ................ 340/436

FOREIGN PATENT DOCUMENTS

| JP | 07 120 258 | 5/1995 |
| JP | 8-16999 | 1/1996 |
| JP | 9222649 | 9/1997 |

\* cited by examiner

*Primary Examiner*—Jeffery Hofsass
*Assistant Examiner*—Hung Nguyen

(57) ABSTRACT

A position detecting device for a vehicle detects the position of an object in a real space coordinate system. A plurality of objects are extracted from an image obtained by cameras, and a pitching-dependent correction amount is calculated based on amounts of displacement in position of the plurality of objects in a direction of height. Positions of the plurality of objects are corrected based on the pitching-dependent correction amount.

8 Claims, 7 Drawing Sheets

*FIG. 4*
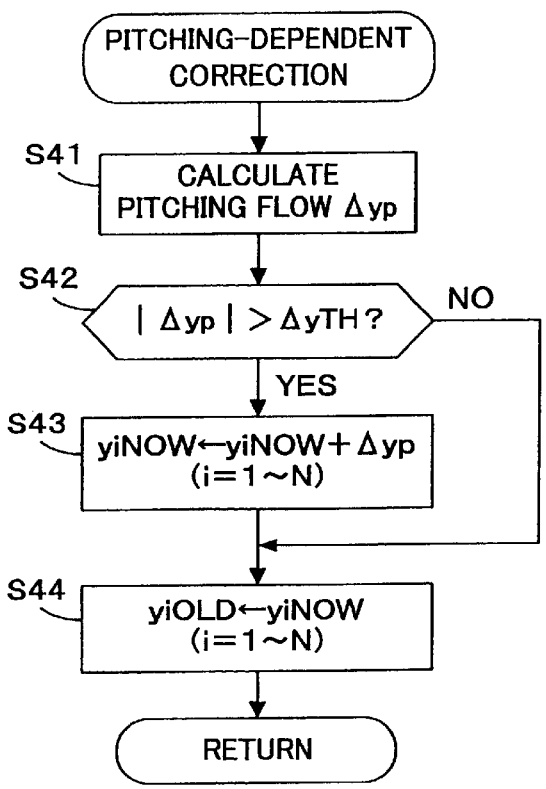
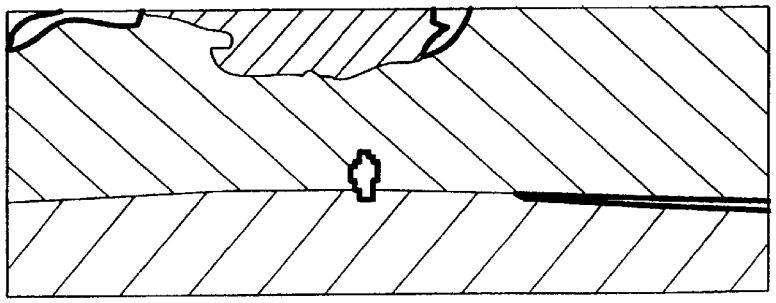
*FIG. 5A*
RIGHT IMAGE
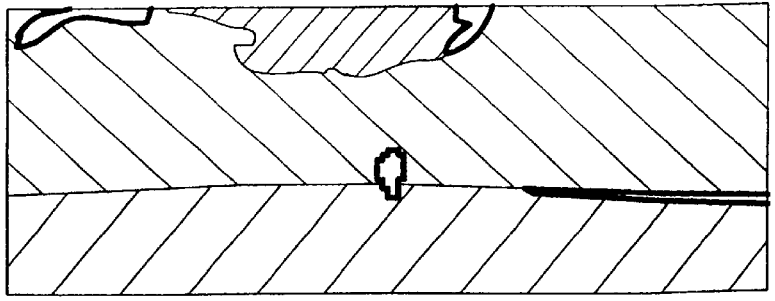
*FIG. 5B*
LEFT IMAGE L1: (x3, y3, 2)
L2: (x4, y4, 2)
L3: (x3, y5, 3)
L4: (x7, y3, 8)
L5: (x8, y4, 7)
L6: (x9, y5, 8)
L7: (x9, y6, 8)
L8: (x8, y7, 8)

OBJECT 1    OBJECT 2

L1: (x3, y3, 2, 1)
L2: (x4, y4, 2, 1)
L3: (x3, y5, 3, 1)
L4: (x7, y3, 8, 2)
L5: (x8, y4, 7, 2)
L6: (x9, y5, 8, 2)
L7: (x9, y6, 8, 2)
L8: (x8, y7, 8, 2)

OBJECT LABEL

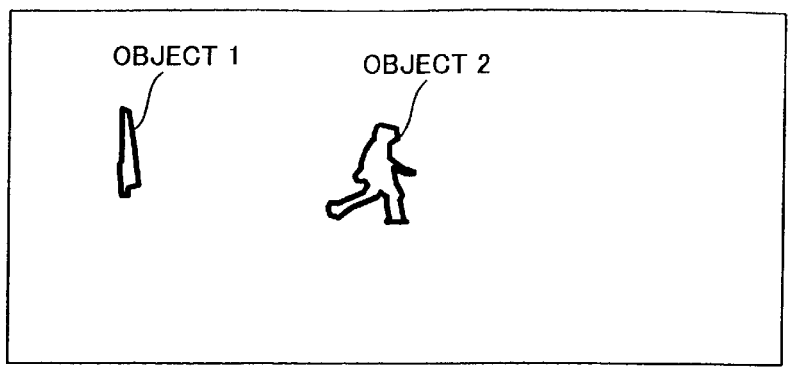
*FIG. 8A*
TIME k
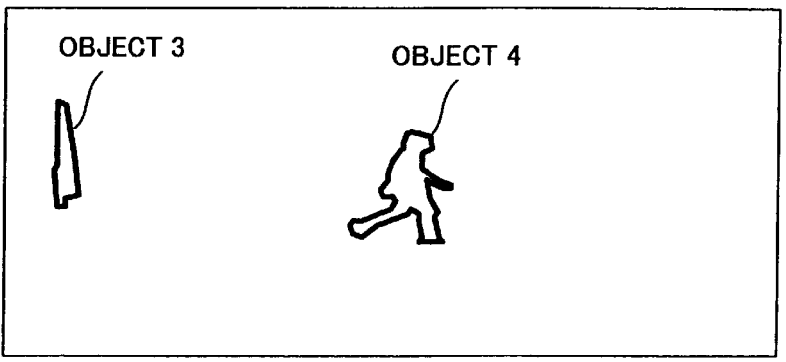
*FIG. 8B*
TIME (k+1)
*FIG. 9*
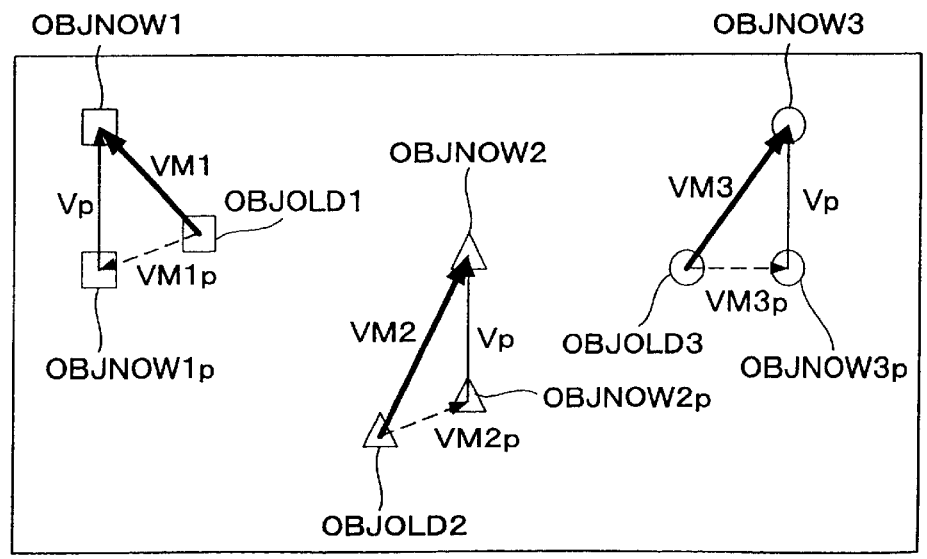

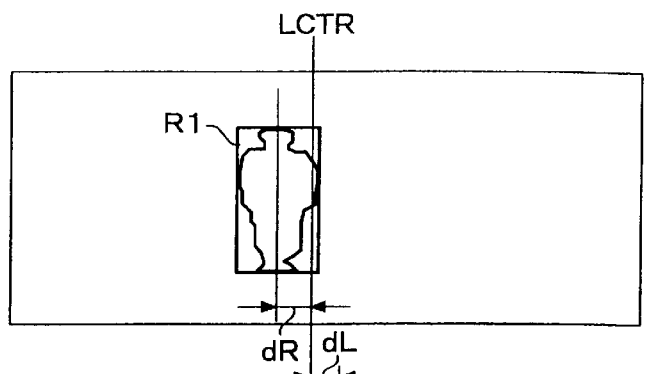
FIG. 10A
RIGHT IMAGE
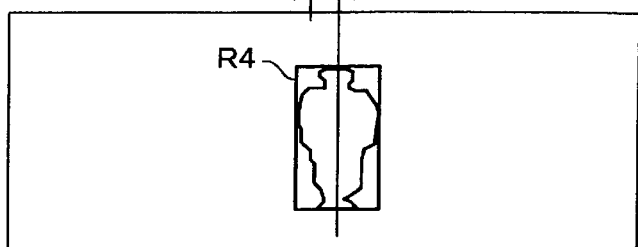
FIG. 10B
LEFT IMAGE
FIG. 11
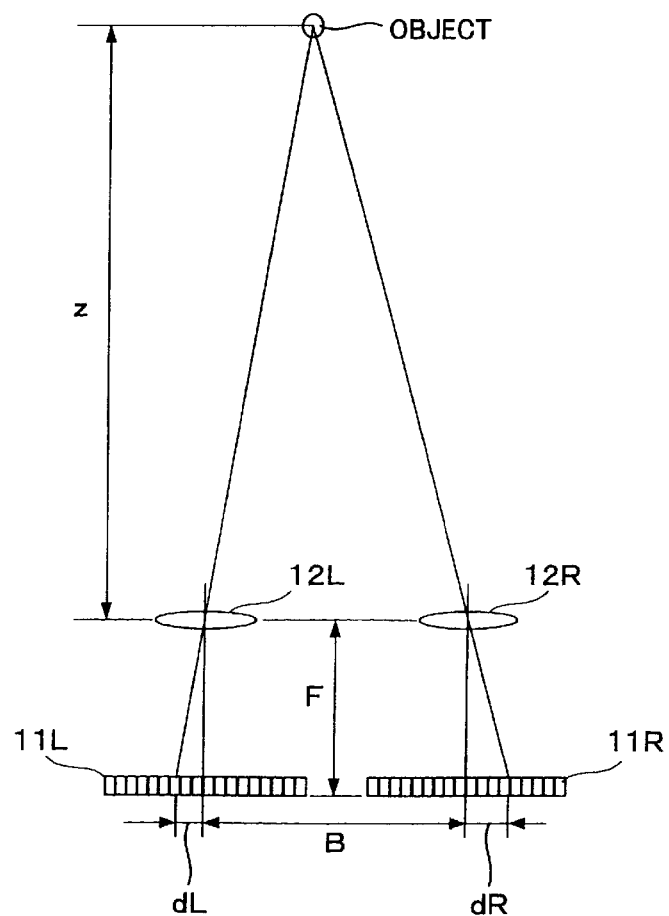

US 6,531,959 B1

POSITION DETECTING DEVICE

BACKGROUND OF THE INVENTION

1. Field of the Invention

This invention relates to a position detecting device for detecting the position of an object, based on an image obtained by an imaging device installed on a vehicle.

2. Description of the Prior Art

Conventionally, a vehicle environment monitoring system has been proposed which detects the position of an object from an image taken by an imaging device carried on a vehicle and determines the possibility of collision between the object and the automotive vehicle. In such a system, since the imaging device is installed on the automotive vehicle which moves or travels, the pitching motion of the vehicle causes optical flow (hereinafter referred to as "pitching flow") to occur in the image obtained by the imaging device fixed to the vehicle. The pitching flow is not caused by a motion of an object (or traveling of the vehicle). Accordingly, when the position of the object is detected from the image taken by the imaging device, deviation of a detected position of the object from the proper position thereof becomes large unless the adverse effects of the pitching flow on the position detection are eliminated.

A possible solution to this problem is that a vehicle height sensor is arranged on the vehicle, for detecting a height of the vehicle (vehicle height) from the road surface, and the detected position of the object is corrected based on the vehicle height detected by the sensor. However, this solution requires the provision of a vehicle height sensor, which leads to complicated construction of the whole system.

SUMMARY OF THE INVENTION

It is an object of the invention to provide a position detecting device for a vehicle, which is capable of eliminating the adverse effects of pitching motion of the vehicle on detection of the position of an object, by simple construction thereof, and thereby enabling accurate detection of the position.

To attain the above object, the invention provides a position detecting device for a vehicle, which detects a position of an object in a real space coordinate system, the position detecting device comprising: imaging means installed on the automotive vehicle; correction amount-calculating means for extracting a plurality of objects from an image obtained by the imaging means, and calculating a pitching-dependent correction amount based on amounts of displacement in position of the plurality of objects in a direction of height; and correction means for correcting positions of the plurality of objects based on the pitching-dependent correction amount.

According to this position detecting device, a plurality of objects are extracted from an image obtained by the imaging means, and a pitching-dependent correction amount is calculated based on amounts of displacement in position of the plurality of objects in a direction of height. Positions of the plurality of objects are corrected based on the pitching-dependent correction amount. Therefore, even when displacements of objects in the image in the direction of height are caused by pitching motion of the vehicle, the adverse effects of the displacements can be eliminated by simple construction, without using a vehicle height sensor or the like, thereby ensuring an accurate position detection.

Preferably, the correction amount-calculating means calculates an average value of the amounts of displacement in position of the plurality of objects as the pitching-dependent correction amount.

More preferably, the correction means executes the correction when the average value is larger than a predetermined threshold value.

According to this preferred embodiment, when the average value of the amounts of displacement in position of a plurality of objects are large, it is presumed that amounts of displacement in position are not caused by other factors (i.e. traveling of the vehicle or movement of the objects in the real space) than the pitching motion because a displacement in position caused by the other factors is very small compared with amounts of displacement in position caused by the pitching motion, and hence this construction of the preferred embodiment makes it possible to obtain an effective pitching-dependent correction amount by a simple construction.

The above and other objects, features, and advantages of the invention will become more apparent from the following detailed description taken in conjunction with the accompanying drawings.

BRIEF DESCRIPTION OF THE DRAWINGS

FIG. 4 is a flowchart showing details of a pitching-dependent correction process executed at a step S20 in FIG. 3;

FIGS. 5A and 5B are diagrams each showing halftone portions as hatched areas, which are useful in explaining gray scale images obtained by infrared cameras in which:

FIG. 5A shows a right image obtained by a right one of the infrared cameras;

FIG. 5B shows a left image obtained by a left one of the same;

FIGS. 8A and 8B are diagrams useful in explaining how objects are tracked at time intervals;

FIG. 9 is a diagram useful in explaining the pitching-dependent correction;

FIGS. 10A and 10B are diagrams useful in explaining a method of calculating a parallax;

FIG. 11 is a diagram useful in explaining a method of calculating a distance between the vehicle and the object based on the parallax.

DETAILED DESCRIPTION

The invention will now be described in: detail with reference to drawings showing an embodiment thereof.

Figure 1:
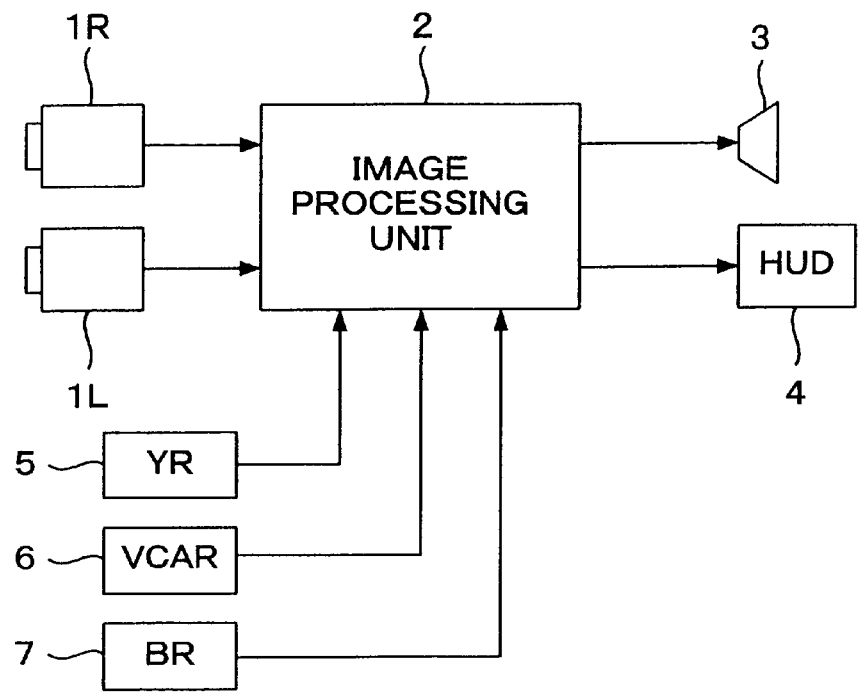
FIG. 1 is a block diagram showing the arrangement of a vehicle environment monitoring system incorporating a position detecting device according to an embodiment of the invention.

Referring first to FIG. 1, there is shown the arrangement of a vehicle environment monitoring system incorporating a position detecting device according to the embodiment of the invention, which has two right and left infrared cameras 1R, 1L capable of detecting far-infrared rays, a yaw rate sensor 5 for detecting yaw rate of the vehicle, a vehicle speed sensor 6 for detecting traveling speed (vehicle speed) VCAR of the vehicle, a brake sensor 7 for detecting an operation amount of a brake, not shown, an image-processing unit 2 for detecting an object, such as an animal or the like, ahead of the vehicle based on image data obtained by the above cameras 1R, 1L and warning the driver when there is a high possibility of collision of the vehicle against the object, a speaker 3 for generating a voice alarm for warning the driver, and a head up display (hereinafter referred to as the "HUD") 4 for displaying an image obtained by the camera 1R or 1L and causing the driver to recognize the object having the high possibility of collision against the vehicle.

Figure 2:
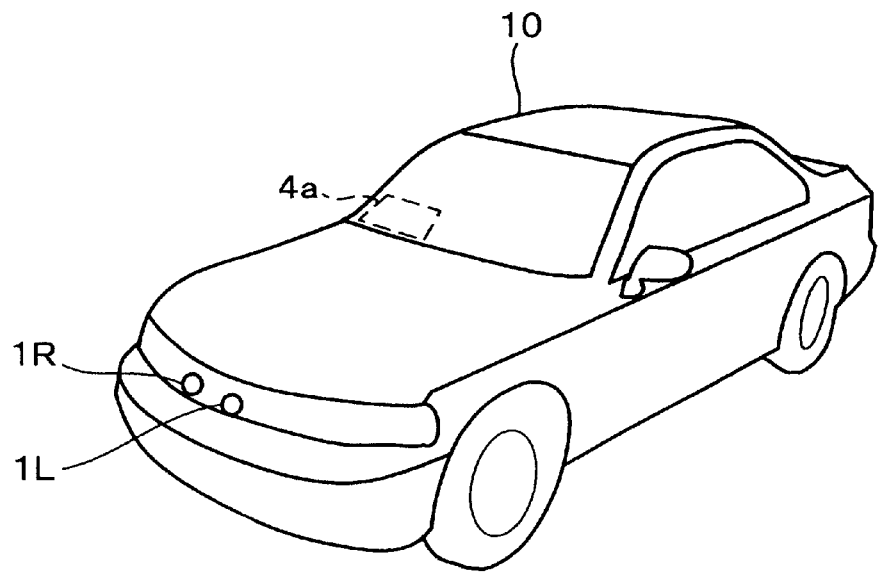
FIG. 2 is a diagram illustrating portions of a vehicle on which infrared cameras appearing in FIG. 1 are mounted.

As shown in FIG. 2, the cameras 1R, 1L are arranged in a front portion of the automotive vehicle 10 at locations symmetric with respect to the longitudinal central axis of the vehicle 10, and rigidly fixed to the vehicle such that the two cameras 1R, 1L have optical axes in parallel with each other and equal heights from a road surface. The infrared cameras 1R, 1L have a characteristic that the output signal level (the luminance of an image of the object) increases as the temperature of an object becomes higher.

The image-processing unit 2 includes an A/D converter circuit for converting input analog signals to digital signals, an image memory for storing digitized image signals, a CPU (Central Processing Unit) for carrying out arithmetic operations, a RAM (Random Access Memory) used by the CPU for storing data being processed in the arithmetic operations, a ROM (Read Only Memory) storing programs executed by the CPU, tables, and maps, and an output circuit for outputting driving signals to the speaker 3, display signals to the HUD 4, and the like. Output signals from the cameras 1R, 1L and the sensors 5 to 7 are converted to digital signals and input to the CPU.

As shown in FIG. 2, the HUD 4 is arranged such that a screen 4a thereof is displayed in a front window at a location ahead of the driver.

Figure 3:
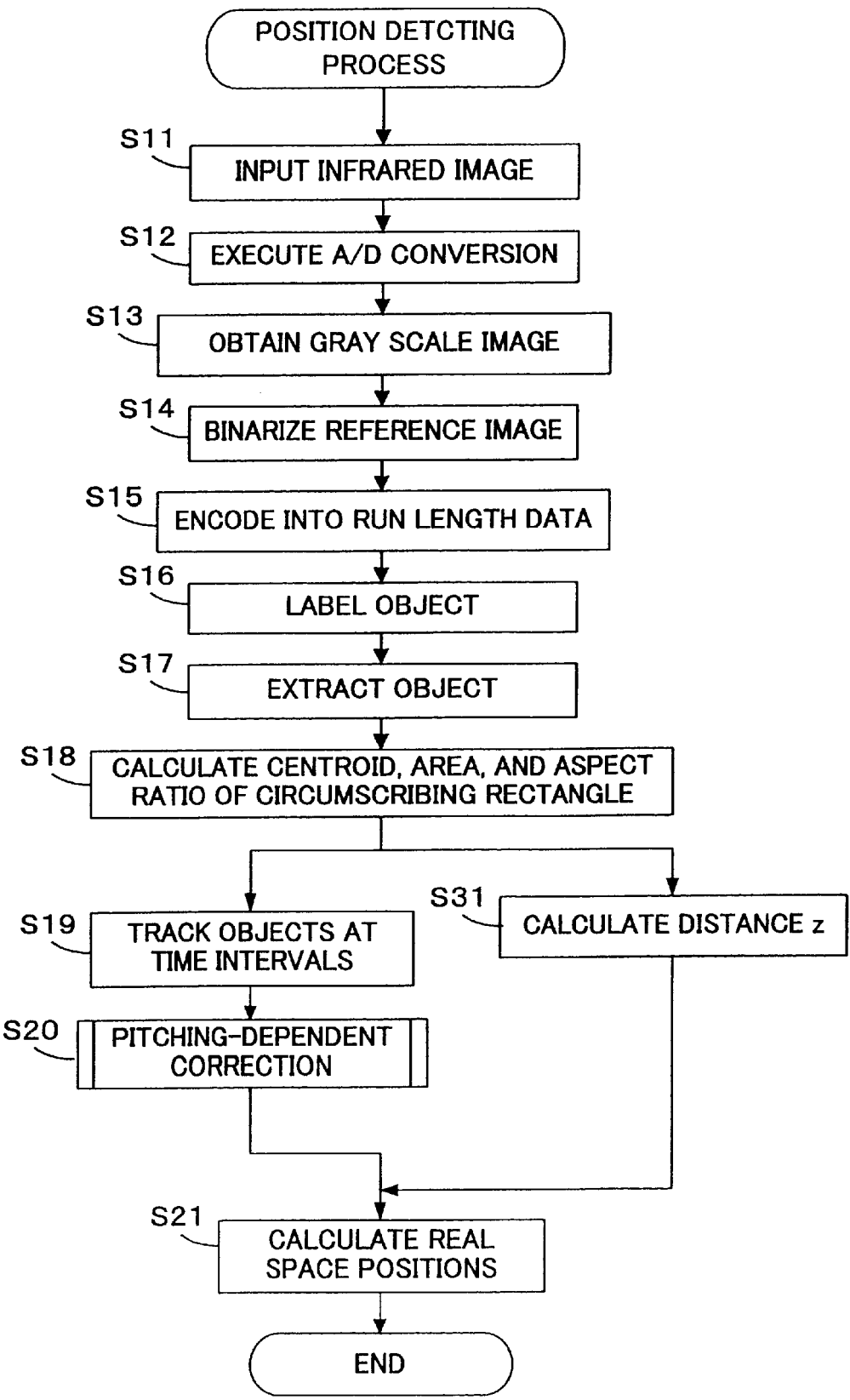
FIG. 3 is a flowchart showing a position-detecting process for detecting the position of an object extracted from an image obtained by an imaging means of the vehicle environment monitoring system.

FIG. 3 is a flowchart showing a procedure of a position-detecting process executed by the image-processing unit 2. First, output signals from the cameras 1R, 1L are subjected to A/D conversion by the A/D converter circuit and the resulting digital data are stored in the image memory (steps S11, S12, S13). Data of images stored in the image memory is data of gray scale images including luminance information. FIGS. 5A and 5B are diagrams for explaining gray scale images obtained by the respective cameras 1R, 1L (a right image by the camera 1R, and a left image by the camera 1L). Hatched areas represent halftone (gray) areas in the right and left images, while areas surrounded by thick solid lines represent areas at a high luminance level (at a high temperature) which are areas (hereinafter referred to as "high luminance areas") of detected objects displayed in white on the screen. In the right image and the left image, an identical object is displayed as images at respective locations horizontally displaced from each other, so that it is possible to calculate a distance from the vehicle 10 to the object based on the displacement (parallax).

Figure 6:
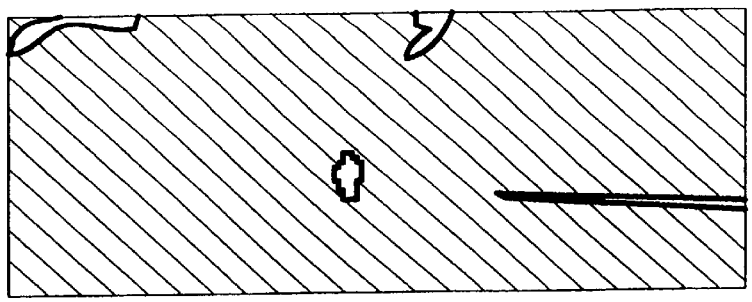
FIG. 6 is a diagram showing a black area as a hatched one, which is useful in explaining an image formed by binarization of a gray scale image.
Figure 6:
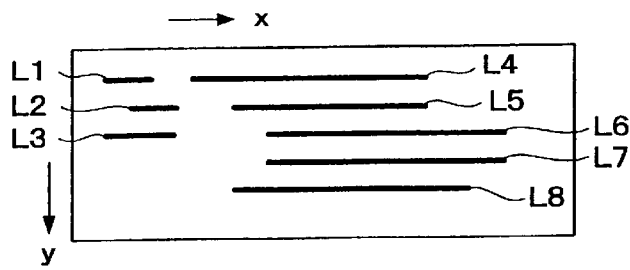

At step S14 in FIG. 3, the right image is set to a reference image, and the digital image data representative of the reference image is binarized (converted to 1-bit data) such that an area at a level of luminance equal to or higher than a luminance threshold ITH which is experimentally determined is set to "1" (white) and an area at a lower level of luminance than the threshold ITH is set to "0" (black). FIG. 6 shows an image obtained by binarization of the FIG. 5A image. In the figure, a hatched area represents a black area, while areas surrounded by thick solid lines (high luminance areas) represent respective white areas.

Figure 7A:
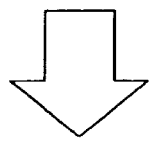
FIGS. 7A to 7C are diagrams which are useful in explaining a process for converting binarized image data to run length data and labeling of objects for identification thereof.

At the following step S15, the binarized image data is encoded into run length data. FIG. 7A is a diagram for explaining the encoding process. In the figure, areas set to white by the above binarization are represented by lines L1 to L8 indicative of respective lines of pixels. Although the lines L1 to L8 each have a width of one pixel in the y direction, and are actually arranged side by side without any gaps in the y direction, they are shown as separate lines spaced from each other for clarity of description. Further, the lines L1 to L8 have respective lengths of two pixels, two pixels, three pixels, eight pixels, seven pixels, eight pixels, eight pixels, and eight pixels in the x direction. The run length data represents each of the lines L1 to L8 by the coordinates of the starting point (point of the left end) of the line and the length (the number of pixels) of the line from the starting point to the ending point (point of the right end) of the same. For instance, the line L3 is formed of three pixels (x3, y 5), (x4, y 5) and (x5, y5), and represented by the run length data (x3, y5, 3).

Figure 7B:
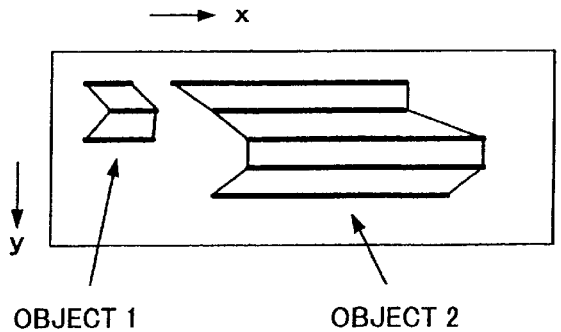
Figure 7B:

At steps S16 and S17, an object is extracted by labeling the same, as shown in FIG. 7B. That is, out of the lines L1 to L8 encoded into the run length data, the lines L1 to L3 overlapping in the y direction are regarded as one object 1, and the lines L4 to L8 overlapping in the y direction are regarded as one object 2, whereby object labels 1 and 2 are added to the run length data. This processing enables e.g. the high luminance areas appearing in FIG. 6 to be grasped as objects 1 to 4, respectively.

Figure 7C:
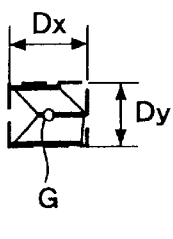
Figure 7C:
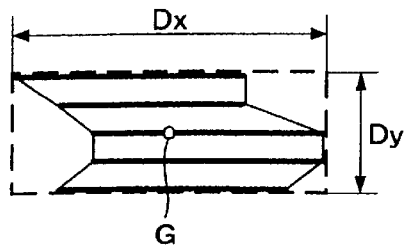

At step S18, as shown in FIG. 7C, the centroid G of an extracted object (image of an object), the area S of the extracted object, and the aspect ratio ASPECT of a rectangle circumscribing the extracted object, indicated by broken lines, are calculated. The area S is calculated by integrating the lengths of the run length data of an identical object. The coordinates of the centroid G is calculated as the x coordinate of a line equally dividing the area S along the y direction into halves, and the y coordinate of a line equally dividing the area S along the x direction into halves. The aspect ratio ASPECT is calculated as a ratio Dy/Dx of Dy to Dx appearing in FIG. 7C. It should be noted that the position of a centroid of the circumscribing rectangle may be used in place of that of the centroid G of the extracted object.

At step S19, objects are tracked at time intervals, that is, identification or recognition of identical objects is carried out whenever each sampling repetition period elapses. Assuming that a time obtained by discretizing time t as an analog amount by a sampling repetition period is represented by k, objects 1 and 2 extracted at time k, as shown in FIG. 8A, and objects 3 and 4 extracted at time (k+1) as shown in FIG. 8B are checked as to their identity. More specifically, it is determined that the objects 3 and 4 are identical with the respective objects 1 and 2 when the following identification conditions (1) to (3) are satisfied, and the objects 3 and 4 are labeled as objects 1 and 2 to thereby track the objects at time intervals:

(1) Assuming that the position coordinates of the centroid of objects i (=1, 2) in an image at time k are represented by (xi(k), yi(k)), and the position coordinates of the centroid of objects j (=3, 4) in an image at time (k+1) are represented by (xj(k+1), yj(k+1)), the following conditions are satisfied:

$$xj(k+1)-xi(k)<\Delta xM,$$

and $$yj(k+1)-yi(k)<\Delta yM$$

wherein $\Delta xM$ and $\Delta yM$ represent maximum allowable values for respective amounts of displacement in the image in the x direction and the y direction. It should be noted that the maximum allowable value $\Delta yM$ in the y direction is set in view of the amount of displacement in the image caused by the pitching motion of the vehicle 10.

(2) Assuming that the areas of the objects i (=1, 2) in the image at time k are represented by Si(k), and the areas of the objects j (=3, 4) in the image at time (k+1) are represented by Sj(k+1), the following condition is satisfied:

$$Sj(k+1)/Si(k)<1\pm\Delta S$$

wherein $\Delta S$ represents a maximum allowable value for a change in the area.

(3) Assuming that the aspect ratios of rectangles circumscribing the objects i (=1, 2) at time k are represented by ASPECT i(k), and the aspect ratios of rectangles circumscribing the objects j (=3, 4) at time (k+1) are represented by ASPECT j (k+1), the following condition is satisfied:

$$\text{ASPECT } j(k+1)/\text{ASPECT } i(k)<1\pm\Delta\text{ASPECT}$$

wherein $\Delta\text{ASPECT}$ represents a maximum allowable value for a change in the aspect ratio.

When comparison is made between FIG. 8A and FIG. 8B, the size of each object is increased in FIG. 8B, but the objects 1 and 3 satisfy the above identification conditions, and the objects 2 and 4 satisfy the above identification conditions. Hence, the objects 3 and 4 can be identified with the respective objects 1 and 2. The position coordinates (of the centroid) of each object thus identified are stored in the memory as time series items of position data, and used for carrying out subsequent arithmetic operations.

At a step S20 in FIG. 3, a pitching-dependent correction process shown in FIG. 4 is executed, for correcting the position of an object on the image when the pitching motion of the vehicle 10 causes optical flow to occur in the image.

FIG. 9 illustrates the relationship between displacement vectors VM1 to VM3 of objects on the image, a pitching vector $V_p$ which represents optical flow caused by the pitching motion of the vehicle, and displacement vectors VM1p to VM3p of the objects assuming that no pitching motion has occurred. In this figure, OBJOLDi and OBJNOWi respectively designate the preceding position (position of one sampling time earlier) and the present position of the each of the objects i (=1, 2, 3).

At step S41 of FIG. 4, the displacement amount along the y-axis on the image caused by the pitching motion of the vehicle (hereinafter referred to as "the pitching flow") is calculated by the following equation (1):

$$\Delta yp = -1/N \sum_{i=1}^{N} (yiNOW - yiOLD) \quad (1)$$

where yiNOW and yiOLD represent the present y coordinate of a centroid of the object i (i=1 to N) and the preceding y coordinate (one sampling time earlier) of the same, respectively, and N represents the number of objects extracted. The pitching flow $\Delta yp$ of the equation (1) is calculated as a displacement amount $\Delta y$ of the y coordinate which minimizes an evaluation function E represented by the following equation (2), and the pitching flow $\Delta yp$ corresponds to an average value of displacement amounts along the y-axis of N objects on the image per unit time period (in the present embodiment, per one sampling period). The displacement amount along the y-axis on the image caused by traveling of the vehicle 10 or motion of the object (the displacement amount along the y-axis assuming that no pitching motion has occurred) is very small compared with the displacement amount caused by the pitching motion of the vehicle, and hence the optical flow caused by the pitching motion (pitching vector $V_p$) does not depend on the position of the image and can be approximated uniformly for all the objects. Therefore, in the present embodiment, the pitching flow $\Delta yp$ is defined as the displacement amount $\Delta y$ along the y-axis which minimizes the evaluation function E of the equation (2):

$$E = \sum_{i=1}^{N} (yiNOW - yiOLD + \Delta y)^2 \quad (2)$$

Then, it is determined at step S42 whether or not the absolute value of the pitching flow $\Delta yp$ is larger than a predetermined threshold value $\Delta yTH$. If $|\Delta yp|>\Delta yTH$, it is determined that the pitching flow of the vehicle 10 is large, and the pitching flow $\Delta yp$ is added to the y coordinate yiNOW of the object i (i=1 to N), thereby carrying out the pitching-dependent correction of detected positions, at step S43. The predetermined threshold value $\Delta yTH$ is set to an appropriate value by experiments.

As described above, displacement in the y direction on the image caused by the traveling of the vehicle 10 or the movement of the object (displacement occurring in the y direction when no pitching motion occurs) is very small compared with displacement caused by the pitching motion, and hence if the absolute value of the pitching flow $\Delta yp$ calculated by the equation (1) is larger than the predetermined threshold value $\Delta yTH$, the value $\Delta yp$ is regarded to be the amount of displacement totally due to the pitching motion of the vehicle, and the y coordinate of the detected position of each object is corrected based on the value $\Delta yp$. The positions OBJNOWip (i=1, 2, 3) indicated in FIG. 9 correspond to the corrected positions of the objects.

On the other hand, if $|\Delta yp|\leq\Delta yTH$, it is determined that the influence of the pitching motion is negligible, and the program immediately proceeds to a step S44 without executing the correction of the y coordinates.

At step S44, the present value yiNOW of the y coordinate of each object is set to the preceding value yiOLD, followed by terminating the program. According to this step, the present values obtained by the present processing is used as the immediately preceding values in the processing at one sampling time period later.

According to the FIG. 4 process, the amount of displacement $\Delta yp$ in the y direction (i.e. in the direction of height)

caused by the pitching motion of the vehicle 10 is calculated based on the image per se obtained by the camera 1R, and the y coordinate of each object is corrected based on this amount. This makes it possible to realize the pitching-dependent correction of detected positions by simple construction of the device, and as a result, the position of each object in the real space coordinates can be more accurately detected, as described in detail hereinbelow.

It should be noted that the steps S14 to S20 in the FIG. 3 flowchart are executed on the binarized reference image (the right image in the present embodiment).

At a step S31 in FIG. 3, as shown in FIG. 10, an object image R2 in the left image corresponding to an object image R1 contained in the right image is determined, and then, a distance dR between the center line LCTR of the right image in the x direction and a centroid of the object image R1, and a distance dL between the center line LCTR of the left image in the x direction and a centroid of the object image R2 are calculated. The values thus calculated are applied to the following equation (3) to calculate a distance z from the vehicle 10 to the object. The step S31 takes a longer time period than the processes at steps S19 and 20, and hence it is executed at a longer repetition period than that of the processes at steps S19 and 20 (approximately three times as long as a repetition period of execution of the processes from step S11 to step S20).

$$z = \frac{B \times F}{(dL + dR) \times p} = \frac{B \times F}{\Delta d \times p} \quad (3)$$

wherein B designates the length of a baseline, that is, a horizontal distance (in the x direction) between the center position of an imaging element 11R of the camera 1R and the center position of an imaging element 11L of the camera 1L (i.e. distance between the optical axes of the respective cameras), as shown in FIG. 11; F designates the focal distance of lens 12R, 12L; p designates a space interval between pixels in the imaging elements 11R, 11L; and $\Delta d$ (=dR+dL) represents the amount of parallax. Further, f represents a ratio of the focal distance F to the space interval p.

Figure 12A:
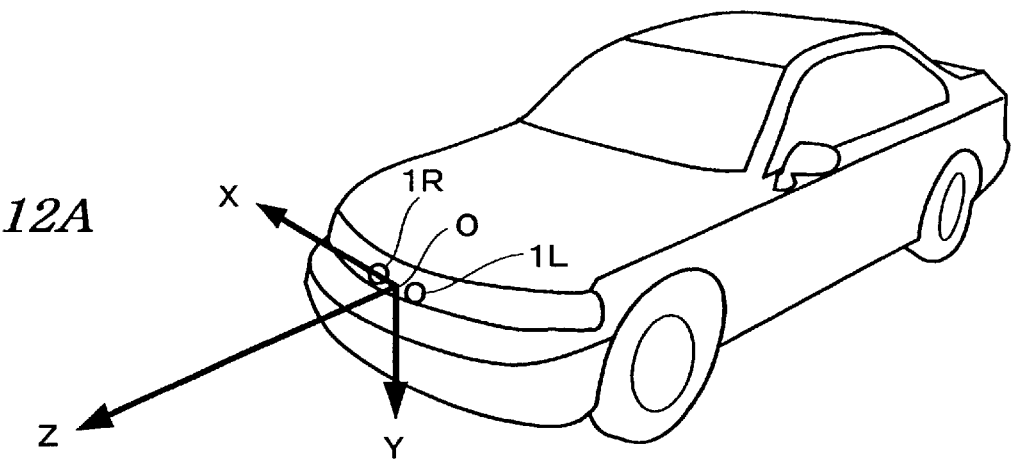
FIGS. 12A and 12B are diagrams useful for explaining a coordinate system used in the present embodiment.
Figure 12B:
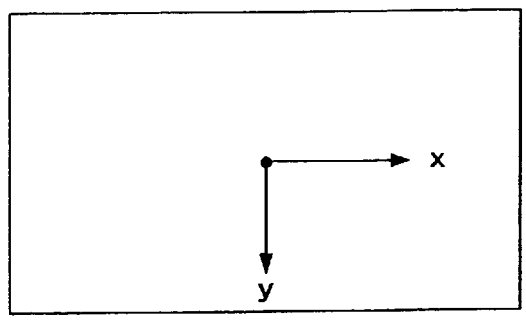

At step S21, coordinates (x, y) in the image and the distance z calculated by using the equation (3) are applied to the following equations (4) for conversion to real space coordinates (X, Y, Z). Here, the coordinate system of the real space coordinates (X, Y, Z) (real space coordinate system) is defined as shown in FIG. 12A with the position of a mid point (position fixed on the automotive vehicle 10) of mounting positions at which the cameras 1R, 1L are mounted being set to an origin O of the real space coordinate system, and coordinates in a coordinate system of an image (imaginary image, referred to hereinafter) corresponding to the real coordinate system is defined as shown in FIG. 12B, with the center of the image being set to the origin of the coordinate system corresponding to the real space coordinate system, the horizontal direction being defined as the x direction, and the vertical direction being defined as the y direction.

$$\begin{bmatrix} X \\ Y \\ Z \end{bmatrix} = \begin{bmatrix} xc \times z/f \\ yc \times z/f \\ z \end{bmatrix} \quad f = F/p \quad (4)$$

In these equations, (xc, yc) are obtained by converting the coordinates (x, y) in the coordinate system of the right image to coordinates in the coordinate system of the imaginary image, the center of which is caused to coincide with the origin O of the real space coordinate, based on the relative relationship of the mounting position of the camera 1R and the origin O of the real space coordinate system. Further, f represents a ratio between the focal distance F and the pixel-to-pixel space interval p.

As described above, according to the present embodiment, the pitching flow $\Delta yp$ indicative of the displacement in the y direction, i.e. in the direction of height of the vehicle 10 which is caused by the pitching motion of the vehicle 10 is calculated from image data obtained by the camera 1R, and the y coordinate of each object is corrected based on the pitching flow $\Delta yp$. Therefore, it is possible to obtain accurate data of positions of objects by eliminating the influence of the pitching motion of the vehicle 10.

The image-processing unit 2 determines possibility of collision between the object and the vehicle 10, based on information of the position of an object in the real space calculated by the FIG. 3 process, and warns the driver if the possibility is high, via the speaker 3 and the HUD 4.

In the present embodiment, the image-processing unit forms the position detecting device. More specifically, the steps S16 to S19 in FIG. 3 and the step S41 in FIG. 4 correspond to correction amount-calculating means, the steps S42 and S43 in FIG. 4 correspond to correction means.

It should be noted that the invention is by no means limited to the above embodiment, but various variations and modifications are possible. For instance, although in the above embodiment, the average value of displacement amounts in the y coordinates of all extracted objects is set to the pitching flow $\Delta yp$, this is not limitative, but the pitching flow $\Delta yp$ may be calculated from displacement amounts in the y coordinates of some (but, at least two) of the extracted objects.

Further, although in the present embodiment, infrared cameras are used as imaging means, this is not limitative, but TV cameras capable of detecting only normal visible rays, as disclosed in Japanese Laid-Open Patent Publication (Kokai) No. 9-226490, may be employed. By using infrared cameras, however, the extraction process for extracting an animal or a running vehicle can be simplified, and the system can be realized by using an arithmetic unit having relatively low performance.

It is further understood by those skilled in the art that the foregoing is a preferred embodiment of the invention, and that various changes and modifications may be made without departing from the spirit and scope thereof as set for thin the appended claims.

What is claimed is:

1. A position detecting device for a vehicle, which detects a position of an object in a real space coordinate system, the position detecting device comprising:

imaging means installed on said vehicle for obtaining an image of an object;

correction amount-calculating means for extracting a plurality of objects from an image obtained by said imaging means, and calculating a pitching-dependent correction amount based on amounts of displacement in position of said plurality of objects in a direction of height; and correcting means for correcting positions of said plurality of objects based on said pitching-dependent correction amount.

2. A position detecting device according to claim 1, wherein said correction amount-calculating means calculates an average value of said amounts of displacement in position of said plurality of objects as said pitching-dependent correction amount.

3. A position detecting device according to claim 2, wherein said correction means executes said correction when said average value is larger than a predetermined threshold value.

4. A position detecting device according to claim 1, wherein said imaging means comprises an infrared camera.

5. A position detecting device for a vehicle, which detects a position of an object in a real space coordinate system, the position detecting device comprising:

an imaging device installed on said vehicle for obtaining an image of an object;

a correction amount-calculating device which extracts a plurality of objects from an image obtained by said imaging device, and calculates a pitching-dependent correction amount based on amounts of displacement in position of said plurality of objects in a direction of height; and a correcting device which corrects positions of said plurality of objects based on said pitching-dependent correction amount.

6. A position detecting device according to claim 5, wherein said correction amount-calculating device calculates an average value of said amounts of displacement in position of said plurality of objects as said pitching-dependent correction amount.

7. A position detecting device according to claim 6, wherein said correction device executes said correction when said average value is larger than a predetermined threshold value.

8. A position detecting device according to claim 5, wherein said imaging device comprises an infrared camera.

* * * * *

UNITED STATES PATENT AND TRADEMARK OFFICE
CERTIFICATE OF CORRECTION

PATENT NO.    : 6,531,959 B1
DATED         : March 11, 2003
INVENTOR(S)   : Nobuharu Nagaoka et al.

It is certified that error appears in the above-identified patent and that said Letters Patent is hereby corrected as shown below:

Title page,
Insert: -- [74] *Attorney, Agent, or Firm* – Carrier, Blackman & Associates, P.C.; Joseph P. Carrier; William D. Blackman --.

Drawings,
Sheet 2 of 7, Fig. 3, change "DETCTING" to -- DETECTING --.

Column 2,
Line 63, after "embodiment" change the semi-colon to a period.
Line 66, delete the colon.

Column 3,
Line 43, change "screen 4 a" to -- screen 4a --.

Column 5,
Line 56, change "$V_p$" to -- Vp --.
Line 58, change "VM1$p$ to VM3$p$" to -- VM1p to VM3p --.
Line 63, change "position of the each" to -- position of each --.

Column 6,
Line 23, change "$V_p$" to -- Vp --.

Column 7,
Line 61, Equation (4), move "f = F/p" to a separate text line under the rest of the equation shown, because "f = F/p" is a separate equation.

UNITED STATES PATENT AND TRADEMARK OFFICE
CERTIFICATE OF CORRECTION

PATENT NO.    : 6,531,959 B1
DATED         : March 11, 2003
INVENTOR(S)   : Nobuharu Nagaoka et al.

It is certified that error appears in the above-identified patent and that said Letters Patent is hereby corrected as shown below:

Column 8,
Line 46, after "thereof" insert a comma; change "for thin" to -- forth in --.

Signed and Sealed this

Twelfth Day of August, 2003

JAMES E. ROGAN
*Director of the United States Patent and Trademark Office*